No. 837,491. PATENTED DEC. 4, 1906.
N. P. NELSON.
DISK JOINTER.
APPLICATION FILED MAR. 9, 1906.
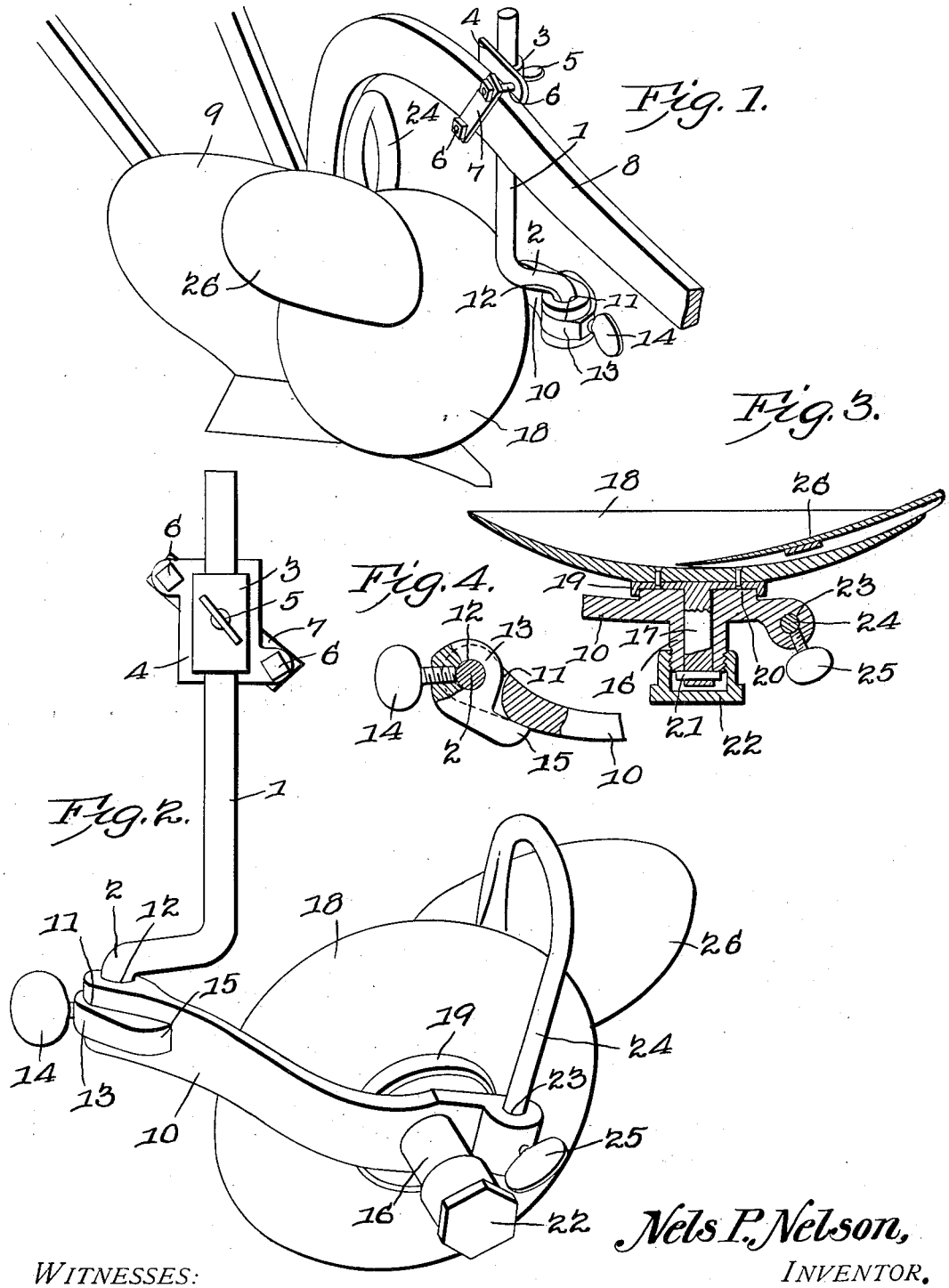
Nels P. Nelson,
INVENTOR.
WITNESSES:
By C. A. Snow & Co.
ATTORNEYS

UNITED STATES PATENT OFFICE.

NELS P. NELSON, OF LEXINGTON, OREGON.

DISK JOINTER.

No. 837,491.  Specification of Letters Patent.  Patented Dec. 4, 1906.

Application filed March 9, 1906. Serial No. 305,158.

*To all whom it may concern:*

Be it known that I, NELS P. NELSON, a citizen of the United States, residing at Lexington, in the county of Morrow and State of Oregon, have invented a new and useful Disk Jointer, of which the following is a specification.

This invention relates to disk jointers for plows; and the objects of the invention are to simplify and improve the construction and operation of this class of devices.

With these and other ends in view, which will readily appear as the nature of the invention is better understood, the same consists in the improved construction and novel arrangement and combination of parts, which will be hereinafter fully described, and particularly pointed out in the claims.

In the accompanying drawings has been illustrated a simple and preferred form of the invention, it being, however, understood that no limitation is necessarily made to the precise structural details therein exhibited, but that changes, alterations, and modifications within the scope of the invention may be resorted to when desired.

In the drawings, Figure 1 is a perspective view showing the improved jointer attached to a plow in position for operation. Fig. 2 is a rear view of the disk jointer and related parts. Fig. 3 is a sectional view on an approximately horizontal plane, taken through the axis of the disk and adjacent parts. Fig. 4 is a sectional detail taken through the supporting-arm and the stop member for the latter.

Corresponding parts in the several figures are indicated throughout by similar characters of reference.

The shank or member 1 whereby the improved disk jointer is connected with the beam of a plow in position for operation has been shown as consisting of a round rod of iron or steel of suitable dimensions to insure strength and rigidity and provided at its lower end with a crank 2. The shank 1 extends through a sleeve 3, formed upon a clip-plate 4 and having a set-screw 5, adapted to press against the shank 1, which latter may be thereby securely retained at various adjustments. The clip-plate 4 is apertured for the passage of connecting members, such as bolts 6, whereby it is connected with a clamping-plate 7, the clip-plate and the clamping-plate receiving between them the beam 8 of a plow 9 in connection with which the improved disk jointer is to be used and upon which the shank 1 may thus be securely mounted in any desired position.

The disk constituting the jointer is carried by a supporting-arm 10, at one end of which are formed a recess or bifurcation 11 and a vertical aperture 12, the latter engaging the crank 2 at the lower end of the shank 1. A collar 13 is fitted in the recess 11 of the arm 10, said collar being provided with a set-screw 14, adapted to bear against the crank 2, upon which the collar may thus be securely retained, said collar serving also to retain in position the securing-arm 10, which latter, however, is free to rotate upon the crank 2 to a certain extent, the movement of said supporting-arm being checked by a stop-lug 15, extending from the collar and lying in the path of the supporting-arm. The stop member 15 is disposed adjacent to what may be regarded as the "rear" side of the supporting-arm, and the latter will thus be free to swing or to move in a forward direction only, its movement in a rearward direction being checked by the stop-lug 15 of the collar 13, which latter, however, may be readily adjusted, so as to regulate the extent of the rearward movement of the supporting-arm.

The supporting-arm 10 is provided near its free end with an approximately horizontal sleeve 16, affording a bearing for the spindle or axle 17 of the disk 18, which latter is a concavo-convex disk of ordinary construction and of suitable dimensions. The spindle is formed with a flanged plate 19, riveted upon or otherwise suitably connected with the back of the disk, said flanged plate serving to accommodate a boss 20, formed integral with the supporting-arm 10. The spindle 17, which projects through the sleeve 16, is apertured for the reception of a pin or key 21, and the extremity of the sleeve 16 is externally threaded for the reception of a cap-nut 22, which serves to prevent loss or displacement of the pin 21 and which also excludes dust and grit from the bearing in which the disk is thus supported for rotation.

The free extremity of the supporting-arm 10 has an approximately vertical aperture 23 for the passage of an inverted-U-shaped shank 24, which is retained in position adjustably by means of a set-screw 25. The shank 24 extends upwardly above the upper edge of the disk 18 and is curved in a forward and downward direction, carrying at its terminal end a scraper-plate 26, which constitutes a moldboard that operates, in conjunction with the rotary disk, to keep the latter free from adhering dirt and to turn the furrow-slice which is loosened by the disk.

The operation and advantages of the improved disk jointer will be readily understood from the foregoing description, taken in connection with the drawings hereto annexed. The shank 1 may be conveniently connected with the plow-beam any desired distance in front of the plow proper, and it is not only vertically adjustable in the supporting-sleeve 3, but by adjusting the shank axially in the sleeve or by turning it upon its axis the crank 2 will be adjusted so as to regulate the position of the supporting-arm and the disk carried thereby laterally with relation to the plow 9. Further adjustment may be had by manipulating the collar 13, having the stop member 15, whereby the disk-carrying arm may be checked in a position to present the disk at any desired angle to the line of progress, thereby regulating the width of the furrow turned thereby. It will thus be seen that the improved disk jointer is susceptible of every variety of adjustment and that its operation will be thorough and efficient.

Having thus described the invention, what is claimed is—

1. In a device of the class described, a supporting-shank having a crank, a disk-carrying arm having a bifurcated end pivoted upon said shank, a collar fitted upon the crank within the recess or bifurcation of the disk-carrying arm, and having a stop-lug for the arm which extends outwardly from the recess in the direction toward the free end of the arm and along one side of the latter, and means for securing the collar adjustably upon the crank.

2. In a device of the class described, a supporting-arm having a sleeve extending from one side thereof and a boss on the opposite side having a flat face of substantial area, a solid shank-spindle rotatably mounted in the sleeve and boss which is provided with a transversely-extending plate portion coextensive with and bearing on the flat face of the boss and having an integral flange peripherally engaging the boss, a single device on the end of the spindle which engages the sleeve for holding the spindle in place, and a disk secured solely to the plate portion of the spindle.

3. In a device of the character described, a supporting-arm pivotally mounted at one end and provided with a sleeve and an eye at its opposite end which are disposed with their axes at right angles, a rotatable spindle mounted in the sleeve and provided with a plate portion, a disk secured to the plate portion of the spindle, a scraper coöperating with the disk, and a U-shaped shank supporting the scraper which is adjustable longitudinally and angularly in the eye of the supporting-arm.

4. In a device of the class described, a supporting-arm pivotally mounted at one end on a vertical axis and provided with a horizontal sleeve on one side of the arm at the opposite end and with a perforated boss on the opposite side of the arm and disposed in line with the sleeve, an eye arranged adjacent the said sleeve with its axis vertical, a spindle mounted in the perforated boss and sleeve which is provided with a flanged plate arranged with the flange thereof peripherally engaging the said boss, a disk, means for rigidly securing the disk to the flanged plate, a scraper coöperating with the disk, and a supporting-shank for the scraper which is angularly and longitudinally adjustable in the eye of the supporting-arm.

In testimony that I claim the foregoing as my own I have hereto affixed my signature in the presence of two witnesses.

NELS P. NELSON.

Witnesses:
  W. E. LEACH,
  R. C. WARREN.